United States Patent
Lee et al.

(10) Patent No.: US 9,110,592 B2
(45) Date of Patent: Aug. 18, 2015

(54) DYNAMIC ALLOCATION OF HETEROGENOUS MEMORY IN A COMPUTING SYSTEM

(71) Applicant: Microsoft Corporation, Redmond, WA (US)

(72) Inventors: Brian Lee, Redmond, WA (US); Marc Tremblay, Clyde Hill, WA (US); Barry Bond, Redmond, WA (US); Vlad Sadovsky, Redmond, WA (US); Mark John Ramberg, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 13/758,613

(22) Filed: Feb. 4, 2013

(65) Prior Publication Data

US 2014/0223098 A1 Aug. 7, 2014

(51) Int. Cl.
*G06F 12/08* (2006.01)
*G06F 3/06* (2006.01)
(Continued)

(52) U.S. Cl.
CPC ............ *G06F 3/0604* (2013.01); *G06F 9/5016* (2013.01); *G06F 12/0646* (2013.01); *G06F 12/08* (2013.01); *G06F 2209/501* (2013.01); *Y02B 60/142* (2013.01)

(58) Field of Classification Search
CPC ... G06F 3/0604; G06F 12/08; G06F 12/0646; G06F 9/5016
USPC ......... 711/5, 118, 154, 156, 170; 365/185.33; 713/300, 320
See application file for complete search history.

(56) References Cited

U.S. PATENT DOCUMENTS 5,568,651 A * 10/1996 Medina et al. ................... 710/74
6,567,904 B1 * 5/2003 Khandekar et al. ............ 711/170
6,904,506 B2 * 6/2005 Wu et al. ........................ 711/170
(Continued)

FOREIGN PATENT DOCUMENTS

EP       1691288 A2    8/2006
WO    2011/020055 A1    2/2011

OTHER PUBLICATIONS

"International Search Report & Written Opinion for PCT Patent Application No. PCT/US2014/013468", Mailed Date: May 20, 2014, Filed Date: Jan. 29, 2014, 11 pages.
(Continued)

*Primary Examiner* — Stephen Elmore
(74) *Attorney, Agent, or Firm* — Steve Wight; Judy Yee; Micky Minhas

(57) ABSTRACT

A method of operating a computing device includes dynamically managing at least two types of memory based on workloads, or requests from different types of applications. A first type of memory may be high performance memory that may have a higher bandwidth, lower memory latency and/or lower power consumption than a second type of memory in the computing device. In an embodiment, the computing device includes a system on a chip (SoC) that includes Wide I/O DRAM positioned with one or more processor cores. A Low Power Double Data Rate 3 dynamic random access memory (LPDDR3 DRAM) memory is externally connected to the SoC or is an embedded part of the SoC. In embodiments, the computing device may be included in at least a cell phone, mobile device, embedded system, video game, media console, laptop computer, desktop computer, server and/or datacenter.

20 Claims, 9 Drawing Sheets

(51) Int. Cl.
*G06F 12/06* (2006.01)
*G06F 9/50* (2006.01)

(56) References Cited

U.S. PATENT DOCUMENTS

| | | | |
|---|---|---|---|
| 7,117,328 B2* | 10/2006 | Shibuya et al. | 711/162 |
| 7,490,217 B2* | 2/2009 | Tremaine | 711/207 |
| 8,185,696 B2 | 5/2012 | Vuletic et al. | |
| 8,205,037 B2* | 6/2012 | Swing et al. | 711/103 |
| 8,566,507 B2* | 10/2013 | Sprinkle et al. | 711/103 |
| 8,578,084 B2* | 11/2013 | Borchers et al. | 711/103 |
| 2002/0144074 A1* | 10/2002 | Wu et al. | 711/170 |
| 2007/0174502 A1* | 7/2007 | Lin et al. | 710/16 |
| 2009/0249098 A1 | 10/2009 | Han et al. | |
| 2012/0117312 A1 | 5/2012 | Chan et al. | |
| 2013/0138911 A1* | 5/2013 | Gopalakrishnan et al. | 711/170 |

OTHER PUBLICATIONS

Martinot, Lidwine, "Dynamic Memory Allocation Optimizes Integration of Blackfin® Processor Software", In Analog Dialogue, vol. 37, Issue 3, Jul. 1, 2003, pp. 1-5.

Goossens, K.G.W., "A Protocol and Memory Manager for On-Chip Communication" In IEEE International Symposium on Circuits and Systems, vol. 2, May 6, 2001, pp. 225-228.

Dong, et al., "Simple but Effective Heterogeneous Main Memory with On-Chip Memory Controller Support", In Proceedings of ACM/IEEE International Conference for High Performance Computing, Networking, Storage and Analysis, Nov. 19, 2010, 11 pages.

Ham, Tae Jun, "Designing Scalable Heterogeneous Memory for High-Performance Computing", Published on: Dec. 1, 2011, 12 pages, Available at: http://www.ee.duke.edu/files/ece/GWDD2012_TaeJunHam.pdf.

Kumar, T.S. Rajesh, "On-Chip Memory Architecture Exploration of Embedded System on Chip", Published on: Sep. 2008, 203 pages, Available at: http://www.serc.iisc.ernet.in/graduation-theses/Rajesh_TS.pdf.

Bathen, et al., "HaVOC: A Hybrid Memory-aware Virtualization Layer for On-Chip Distributed ScratchPad and Non-Volatile Memories", In Proceedings of the 49th Annual Design Automation Conference, Jun. 7, 2012, 6 pages.

Gomony, et al., "DRAM Selection and Configuration for Real-time Mobile Systems", In Proceedings of the Design, Automation & Test in Europe Conference & Exhibition (DATE), Mar. 16, 2012, 6 pages.

Weis, et al., "An Energy Efficient DRAM Subsystem for 3D integrated SoCs", In Proceedings of Design,Automation & Test in Europe Conference & Exhibition (DATE), Mar. 16, 2012, 4 pages.

Chipworks.com, "Sony's PS Vita Uses Chip-on-Chip SiP—3D, but not 3D", Technology Blog, Jul. 5, 2012, 5 pages, Available at: http://www.chipworks.com/blog/technologyblog/2012/07/05/sonys-ps-vita-uses-chip-on-chip-sip-3d-but-not-3d/.

Microsoft.com, "Understanding Non-uniform Memory Access", retrieved from Internet on Jan. 15, 2013, 4 pages, Available at: http://msdn.microsoft.com/en-us/library/ms178144%28v=sql.105%29.aspx.

Lin, Mauricio, et al., "Memory Management Approach for Swapless Embedded Systems", Linux Journal, Oct. 31, 2005, 3 pages, Available at: http://www.linuxjournal.com/article/8502.

Hewlett-Packard Corporation, et al., "Advanced Configuration and Power Interface Specification", Dec. 6, 2011, 958 pages.

"Written Opinion Issued in PCT Application No. PCT/US2014/013468", Mailed Date: Jan. 12, 2015, 7 pages.

Silberschatz, et al., "Operating System Concepts, Chapter 13: Protection", Operating System Concepts, Addison-Wesley Publishing Company, Jan. 1, 1994, pp. 431-457.

* cited by examiner

DYNAMIC ALLOCATION OF HETEROGENOUS MEMORY IN A COMPUTING SYSTEM

BACKGROUND

An operating system (OS) includes processor readable instructions that manages computer hardware resources and provides common services for other computing programs having processor readable instructions, such as application programs (applications). Typically the OS acts as an intermediary between applications and computer hardware. An OS typically schedules tasks for efficient use of computing resources. An OS typically perform basic tasks, such as recognizing input from the keyboard, sending output to the display screen, keeping track of files and directories, and controlling peripheral devices, such as printers and disk drives.

SUMMARY

A method of operating a computing device includes dynamically managing at least two types of memory (heterogeneous memory) based on workloads, or requests from different types of applications. A first type of memory may be high performance memory that may have a higher bandwidth, lower memory latency, higher number of writes before wear-out and/or lower power consumption than a second type of memory in the computing device. In an embodiment, the computing device includes a system on a chip (SoC) that includes Wide I/O DRAM (an example of higher performing memory) positioned adjacent to one or more processor cores. A Low Power Double Data Rate 3 dynamic random access memory (LPDDR3 DRAM) memory (an example of conventional memory) is either internally or externally connected to the SoC. In embodiments, the computing device may be included in at least a cell phone, mobile device, embedded system, video game console, media console, laptop computer, desktop computer, server and/or datacenter.

In an embodiment, an OS allocates the higher performing memory to certain applications having particular workloads or functions (for example, ray tracing, frame/video buffering, NUI (natural user interface) data buffering). The OS may transfer data from a higher performing memory when new data needs to occupy the higher performing memory. The OS and one or more processors, along with the memory controller logic hardware and/or software, also performs error correction to preserve data integrity. An online (web) processor readable catalog of memory characteristics may be accessed by the OS, for the purpose of determining capabilities and/or performance characteristics of different types of memory.

In an embodiment, applications have an attribute flag or information in the application manifest that indicates to the OS that the particular application benefits from using the high performance memory. The OS may not allow access to the high performance memory when the requesting application is not on the applications manifest, or when the requesting application requires more amount of high performance memory than is available. In an embodiment, the OS monitors the execution of the application and keeps track of the memory location accesses and usage patterns. In embodiments, the OS may pass the attribute flag or information to virtual or physical memory allocators, such as memory controllers or memory managers.

In an embodiment, the high performance memory may be used as virtual cache memory or cache memory.

The OS or the memory controller may also interrogate the different types of memory to obtain memory operational details as well as periodically interrogate the different types of memory for health and performance information in embodiments. The OS or the memory controller may also manage the power consumption state of the different types of memory.

A method embodiment allocates a type of memory to an application that is processed by a computing device. The method includes determining the types of integrated circuit memory available in the computing device. The types of integrated circuit memory available include a first high performance type of memory and a second type of memory that is not high performance memory. A request from the application to use the high performance memory is received. The high performance memory is allocated to the application in response to the request.

An apparatus embodiment includes one or more processors and a first processor readable memory having a first performance characteristic. The apparatus also includes a second processor readable memory having a second performance characteristic. The first performance characteristic is better than the second performance characteristic. The one or more processors execute processor readable instructions of an OS to determine whether one or more software applications request usage of the first processor readable memory and an amount of processor readable memory the one or more applications uses. The one or more processors executes the processor readable instructions of the OS to allow at least one of the one or more applications access to the first processor readable memory in response to the request for usage of the first processor readable memory and the amount of processor readable memory the one or more applications uses.

In another embodiment, one or more processor readable memory devices include instructions which when executed cause one or more processors to perform a method that allocates high performance memory to an application. A request from the application to use the high performance memory and an amount of memory the application will use is received. A determination is made as to the amount of high performance memory that is available. The application is allocated the high performance memory in response to the amount of memory the application will use and the amount of high performance memory that is available.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A SoC (a.k.a. SOC) is an integrated circuit (IC) that integrates electronic components and/or subsystems of a computing device or other electronic system into a single semiconductor substrate and/or single chip housed within a single package. For example, memory that was previously in a memory module subsystem in a personal computer (PC) may now be included in a SoC. Similarly, memory control logic may be included in a processor of a SoC rather than in a separately packaged memory controller.

One or more processors of a SoC may also have access to different types of memory that have different types of memory characteristics. Memory characteristics or performance parameters may include, but not limited to, bandwidth, memory latency, power consumption, number of writes before wear-out and/or heat generation. High performance memory, such as a memory that has higher bandwidth (or that may transmit or receive more data per period of time than other memory), may be more costly and may not be as available as memory that does not have a particular high performance characteristic.

Figure 1:
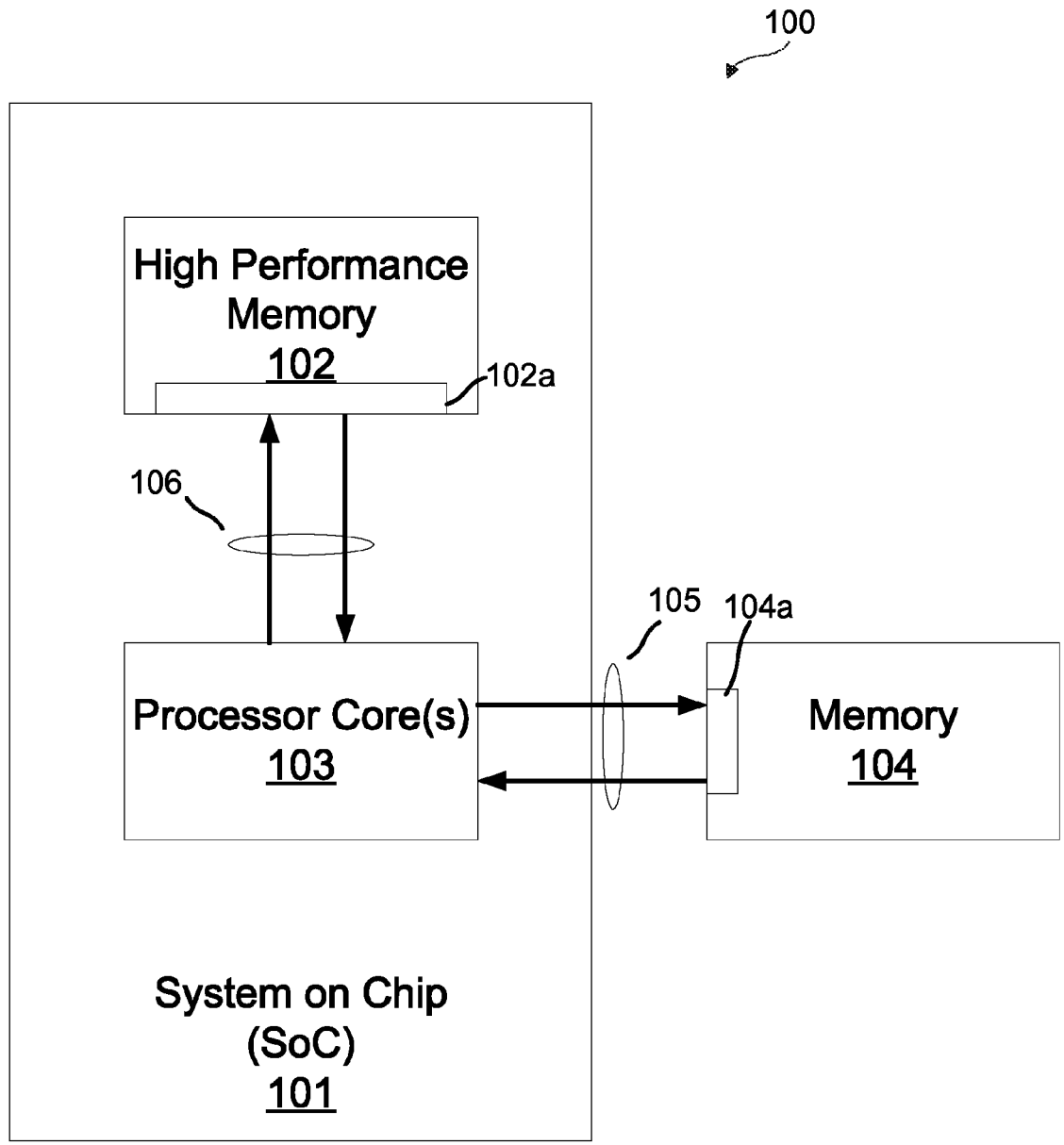
FIG. 1 is a high-level block diagram of an exemplary hardware architecture of a computing device.

FIG. 1 is a high-level block diagram of an exemplary hardware architecture of a computing device embodiment. In embodiments, computing device 100 may be included in at least a cell phone, mobile device, embedded system, video game console, media console, laptop computer, desktop computer, server and/or datacenter.

Computing device 100 includes a SoC 101 and memory 104 in an embodiment. A SoC is an IC that integrates components of a computing device or other electronic system into a single chip or semiconductor substrate. SoC 101 includes one or more processor core(s) 103 and high performance memory 102. Processor core(s) 103 communicate with high performance memory 102 by way of internal signal path 106. In an embodiment, high performance memory 102 includes an interface 102a that is coupled to signal path 106. Processor core(s) 103 also communicates with external memory 104 by way of external signal path 105. In an embodiment, signal paths 106 and 105 are separate signal paths controlled by the OS and an embedded memory controller within the SoC 101.

In an embodiment, memory 104 is external to SoC 101 and may be configured as a memory module or solder-on component on a printed circuit board, such as a motherboard. In an embodiment, memory 104 includes an interface that is coupled to signal path 105 that includes at least a trace or signal line on a printed circuit board. In an embodiment SoC 101 is also coupled to the same printed circuit board that includes signal path 105.

As one of ordinary skill in the art would appreciate, other electronic components may be included in SoC 101. A SoC 101 may include digital, analog, mixed-signal, and/or radio frequency circuits—one or more on a single semiconductor substrate. A SoC 101 may include oscillators, phase-locked loops, counter-timers, real-time timers, power-on reset generators, external interfaces (for example, Universal Serial Bus (USB), IEEE 1394 interface (FireWire), Ethernet, Universal Asynchronous Receiver/Transmitter (USART) and Serial Peripheral Bus (SPI)), analog interfaces, voltage regulators and/or power management circuits.

In alternate embodiments, SoC 101 may be replaced with a system in package (SiP) or package on package (PoP). In a SiP, multiple chips or semiconductor substrates are housed in a single package. In a SiP embodiment, processor core(s) 103 would be on one semiconductor substrate and high performance memory 102 would be on a second semiconductor substrate, both housed in a single package. In an embodiment, the first semiconductor substrate would be coupled to the second semiconductor substrate by wire bonding.

In a PoP embodiment, processor core(s) 103 would be on one semiconductor die housed in a first package and high performance memory 102 would be on a second semiconductor die housed in a second different package. The first and second packages could then be stacked with a standard interface to route signals between the packages, in particular the semiconductor dies. The stacked packages then may be coupled to a printed circuit board having memory 104 as a component in an embodiment.

In embodiments, processor core(s) 103 includes one or more processors that executes (or reads) processor (or machine) readable instructions stored in memory. An example of processor readable instructions may include an OS and/or an application software program (application) for computing device 100 (such as OS 205 and applications 202-204 shown in FIG. 2). Processor core(s) 103 uses high performance memory 102 and memory 104 in response executing processor readable instructions of an OS and application. In an embodiment, processor core(s) 103 may include a processor and memory controller or alternatively a processor that also performs memory management functions similarly performed by a memory controller. Processor core(s) 103 may also include a controller, central processing unit (CPU), graphics-processing unit (GPU), digital signal processor (DSP) and/or a field programmable gate array (FPGA). In an embodiment, high performance memory 102 is positioned on top of processor core(s) 103.

In an embodiment, high performance memory 102 has at least one or more memory characteristic, such as bandwidth, memory latency, heat generation, number of writes before wear-out and/or power consumption that is better in performance than memory 104. For example, high performance memory 102 may be a Wide I/O DRAM having a higher bandwidth than memory 104. Memory 104 may be Low Power Double Data Rate 3 dynamic random access memory (LPDDR3 DRAM) memory (also known as Low Power DDR, mobile DDR (MDDR) or mDDR). In an embodiment, memory interface 102a is a Wide I/O DRAM interface transmitting and receiving signals on signal path 106; while memory interface 104 is a LPDDR3 DRAM interface transmitting and receiving signals on signal path 105.

In embodiments, high performance memory 102 and memory 104 include one or more arrays of memory cells in an IC disposed on separate semiconductor substrates. In an embodiment, high performance memory 102 and memory 104 are included in respective integrated monolithic circuits housed in separately packaged devices. In embodiments, high performance memory 102 and memory 104 may include volatile and/or non-volatile memory.

Types of volatile memory include, but are not limited to, dynamic random access memory (DRAM), molecular charge-based (ZettaCore) DRAM, floating-body DRAM and static random access memory ("SRAM"). Particular types of DRAM include double data rate SDRAM ("DDR"), or later generation SDRAM (e.g., "DDRn").

Types of non-volatile memory include, but are not limited to, types of electrically erasable program read-only memory ("EEPROM"), FLASH (including NAND and NOR FLASH), ONO FLASH, magneto resistive or magnetic RAM ("MRAM"), ferroelectric RAM ("FRAM"), holographic media, Ovonic/phase change, Nano crystals, Nanotube RAM (NRAM-Nantero), MEMS scanning probe systems, MEMS cantilever switch, polymer, molecular, nano-floating gate and single electron.

In embodiments, signal paths 105/106 are media that transfers a signal, such as an interconnect, conducting element, contact, pin, region in a semiconductor substrate, wire, metal trace/signal line, or photoelectric conductor, singly or in combination. In an embodiment, multiple signal paths may replace a single signal path illustrated in the figures and a single signal path may replace multiple signal paths illustrated in the figures. In embodiments, a signal path may include a bus and/or point-to-point connection. In an embodiment, a signal path includes control and data signal lines. In an alternate embodiment, a signal path includes data signal lines or control signal lines. In still other embodiments, signal paths are unidirectional (signals that travel in one direction) or bidirectional (signals that travel in two directions) or combinations of both unidirectional signal lines and bidirectional signal lines.

Figure 2:
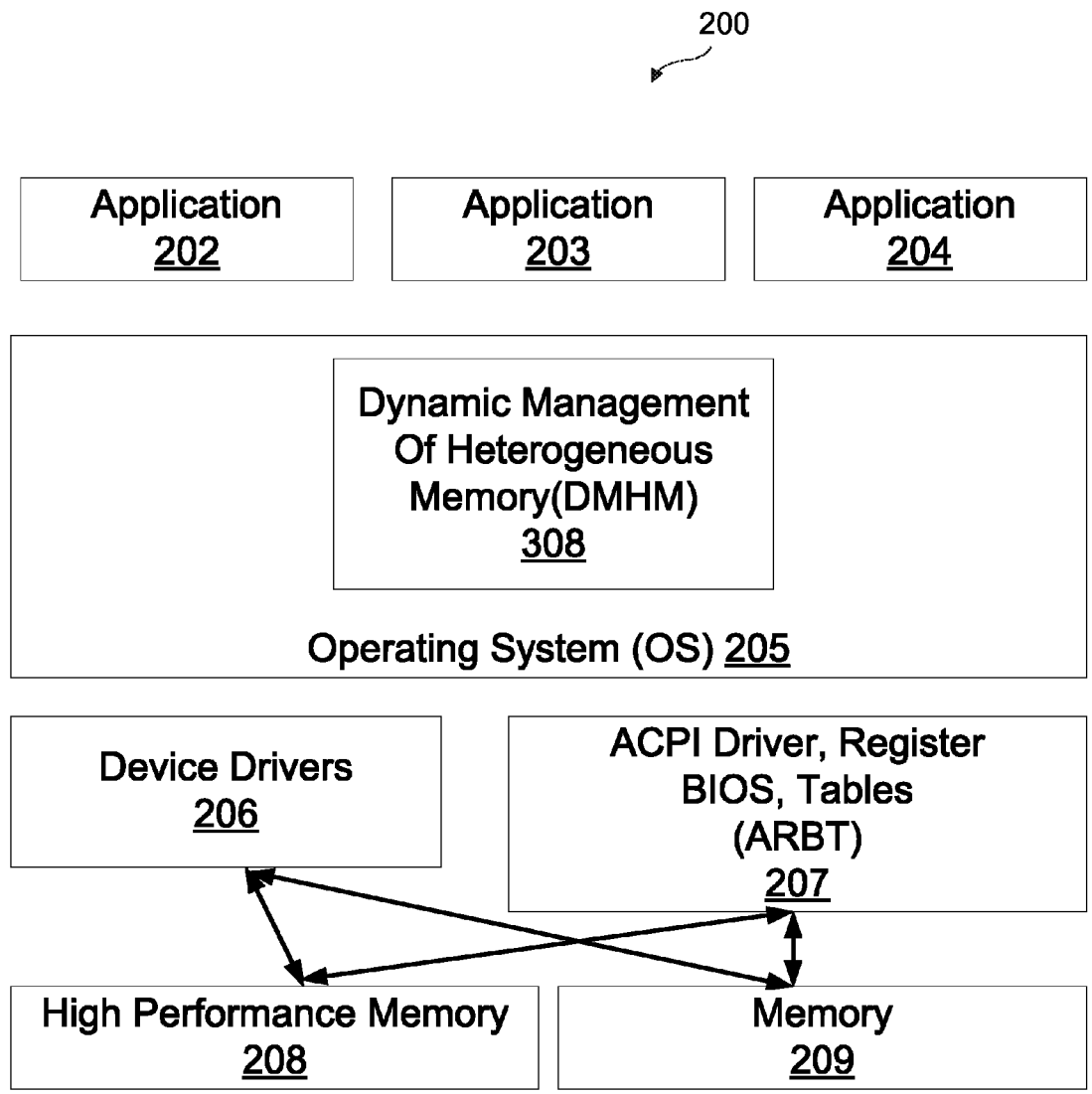
FIG. 2 is a high-level block diagram of an exemplary software architecture to access different types of memory.

FIG. 2 is a high-level block diagram of an exemplary software architecture 200 to access different types of memory. OS 205, and in particular dynamic management of heterogeneous memory (DMHM) 308 determines, among other functions, which application 202-204 are allocated high performance memory 208 and which application 202-204 are allocated memory 209. In embodiments, high performance memory 208 corresponds to high performance memory 102 and memory 209 corresponds to memory 104 described herein and shown in FIG. 1. DMHM 308 determines which of applications 202-204 will have access to high performance memory 208 based on at least whether one of applications 202-204 request high performance memory by way of an attribute flag or information. Once a determination that a particular application will be allocated a particular memory type (either high performance memory 208 or memory 209), the appropriate device drivers 206 is used with OS 205.

OS 205, in particular DMHM 308 also uses an advanced configuration and power interface (ACPI) driver, register, basic input/output system (BIOS) and tables (collectively ARBT) 207 to perform other functions, such as monitoring the health, power and performance of high performance memory 208 and memory 209 as described in detail herein. An ACPI driver discovers, configures, power manages and monitors hardware components, such as memory. For example, OS 205 may use an ACPI driver to turn off a peripheral device when not in use. BIOS is a set of computer instructions in firmware that control input and output operations that is typical stored in non-volatile memory. In an embodiment, a ACPI driver allows the OS 205 to communicate with BIOS and instruct the BIOS to power down peripherals.

Figure 3A:
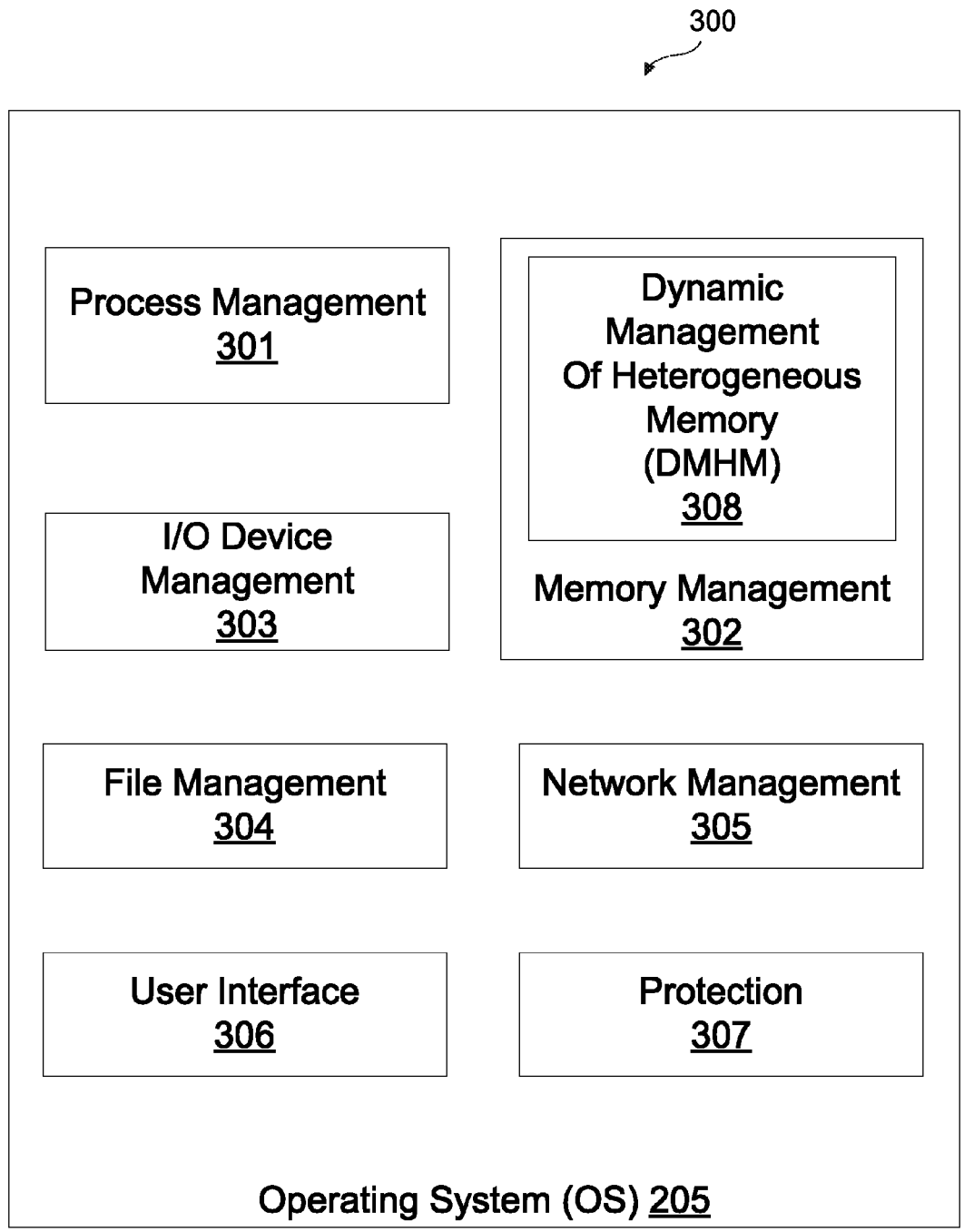
FIG. 3A is a high-level block diagram of an exemplary OS architecture to access different types of memory.

FIG. 3A is a high-level block diagram of an OS architecture 300 to access different types of memory. In an embodiment, OS 205 includes one or more of the software components illustrated in FIG. 3A. In an embodiment, a software component may include a software program, software object, software function, software subroutine, software method, software instance, script and/or a code fragment, singly or in combination. For example, OS 205 includes one or more of process management 301, memory management 302, I/O device management 303, file management 304, network management 305, user interface 306 and protection 307. One or more exemplary function that may be performed by the various OS software components are described below. In alternate embodiment, more or less software components and/or functions of the software components described below may be used.

In embodiments, at least portions of OS 205 are stored in processor readable memory devices. In an embodiment, at least portions of OS 205 are stored in high performance memory 102 and/or in memory 104 illustrated in FIG. 1.

Processes management 301 is responsible for creating and deleting user and system processes. Process management 301 may also be responsible for suspension and resumption of processes. Process management 301 is also responsible for synchronization and communication of processes. Process management 301 is also responsible for deadlock handling Memory management 302 is responsible for keeping track of which part of memory in the different types of memory is currently being used by a particular software component or application. Memory management 302 also decides which processes are loaded into memory when memory space becomes available. Memory management also allocates and deallocates memory space as needed.

In an embodiment, dynamic management of heterogeneous memory (DMHM) 308 is included in memory management 302. DMHM 308 is responsible for, but not limited to, determining types of memory available, allocating particular types of memory to particular applications, monitor memory usage of applications, perform error detection and correction, determine cache available, use memory as actual or virtual cache, monitor performance, health and configuration of memory and manage power of the different types of memory. In an embodiment, software components to perform one or more of the functions of DMHM 308 are illustrated in FIG. 3B.

Figure 3B:
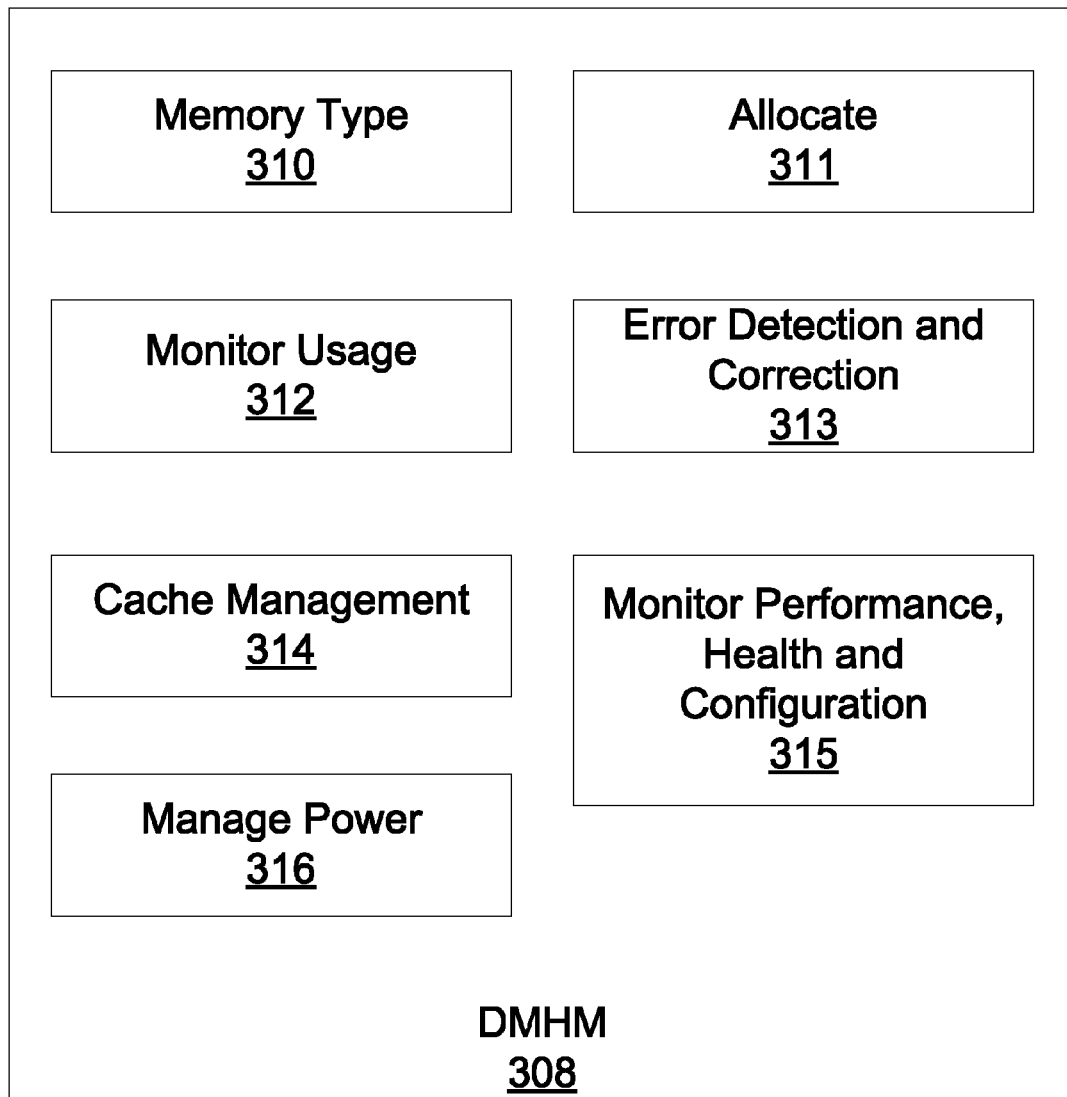
FIG. 3B is a high-level block diagram of an exemplary dynamic management of heterogeneous memory software.

In an embodiment, DMHM 308 includes one or more of the following software components, as illustrated in FIG. 3B: memory type 310, allocate 311, monitor usage 312, detection and error correction 313, cache management 314, monitor performance, health and configuration 315 and/or manage power 316.

Memory type 310 is responsible for determining what types of memory are available in a computing environment. In an embodiment, memory type 310 queries the computing environment to determine what types of memory are available. In an embodiment, memory type 310 determines whether any high performance memory is available. In an embodiment, memory type 310 accesses an online (web) catalog of application characteristics via the Internet, for the purpose of determining capabilities and/or performance characteristics for types of memory that are associated with the listed applications, in a computing environment, such as computing device 100. When a particular memory has certain capabilities and/or performance characteristics that are appropriate for the applications, such as having a bandwidth higher than a predetermined threshold, memory type 310 will assign a particular memory as high performance memory. When the memory does not have a particular capability and/or performance characteristic that meets a predetermined threshold, memory type 310 does not assign the memory as high performance. In an embodiment, the online catalog of memory capabilities and/or performance characteristics is updated/modified as new memory devices become available. In an embodiment an OS tracks and measures performance characteristics of a memory, as related to memory identification and uploads the measured performance characteristics into the online catalog via the Internet. In an embodiment, a user may enter input to console 1002 by way of gesture, touch or voice. In an embodiment, optical I/O interface 1135 receives and translates gestures of a user. In another embodiment, console 1002 includes a natural user interface (NUI) to receive and translate voice and gesture inputs from a user. In an alternate embodiment, front panel subassembly 1142 includes a touch surface and a microphone for receiving and translating a touch or voice, such as a voice command, of a user. In still a further embodiment, a catalog of memory capabilities and/or performance characteristics is stored locally in persistent memory.

Allocate 311 is responsible for allocating a particular type of memory, such as high performance memory, to a particular application that may have requested high performance memory. In an embodiment, an application that may benefit from high performance memory has an attribute flag or information that requests high performance memory. Allocate 311 checks the attribute information before assigning an application to a particular type of memory. In an embodiment, allocate 311 includes a list of attribute information for applications and compares the stored attribute information for the particular application in the list to the attribute information that may be in the application's manifest.

In an embodiment, allocate 311 may pass the attribute information to a virtual memory allocator, which manages the allocation of memory pages to physical memory areas. In another embodiment, allocate 311 may pass the attribute information to a physical memory allocator via a memory controller.

In an embodiment, allocate 311 will determine the amount of memory a particular application that is requesting high performance memory will use, and deny the request when a sufficient amount of high performance memory is not available. In another embodiment allocate 311 will compare run-time priorities of all running or executing applications and deny the request when high performance memory is mapped to an application of higher priority in an embodiment.

In an embodiment, allocate 311 also compares the applications requesting the high performance memory to lists to determine whether to allocate the application to the high performance memory. In an embodiment, allocate 311 includes a list of blacklisted applications for the purpose of preventing certain applications from accessing the higher performing memory. Alternatively, allocate 311 includes a list of whitelisted applications that can use the higher performing memory even if the application's attribute information does not request high performance memory. This list of applications may exist locally in allocate 311, or in online accessible via the Internet, processor readable form elsewhere, and may be updated. In an embodiment, an application that is not assigned high performance memory because it does not have the appropriate attribute information or has been blocked because the application is on a blacklist will be assigned memory that is not high performance.

Since higher performing memory may be faster (greater bandwidth, lower memory latency) as well as more power efficient, certain applications are allocated high performance memory when high performance memory is available, even when the application does not have the appropriate attribute information, so that the computing device may be more power efficient.

Monitor usage 312 is responsible for monitoring the memory usage of an application that has been assigned a particular type of memory. Monitor usage 312 monitors the amount of memory being used, so it will not exceed the physically available memory available in the computing environment. Monitor usage 312 also identifies when high performance memory is available so that allocate 311 may allocate an application to the high performance memory. In an embodiment, Monitor usage 312 uses a memory controller or driver to manage and track the amount of high performance memory a particular application uses. In an embodiment, monitor usage 312 may compile a summary of application usage of accessed memory and store the summary of application usage in persistent memory, occasionally uploading into the stored information to an online catalog via the Internet.

Error detection and correction 313 is responsible for detecting and correcting errors when a particular application uses an allocated type of memory. In various embodiments, different types of detection and error correcting methods may be used. For example, a hash function or checksum method may be used. In another embodiment, parity bits method may be used in an error-correcting code (ECC) or forward error correction (FEC) method.

Cache management 314 is responsible for using high performance memory as cache for one or more processors. In an alternate embodiment, Cache management 315 uses high performance memory as virtual cache.

In an embodiment, high performing memory is used in order to create a virtualized holding space or virtual cache for L1/L2/L3 cache memory. This enables cache memory to be larger and allows L1/L2/L3 cache memory to pool available memory space for its own purpose. In an embodiment, cache management 315 stores data likely to be used by L1/L2/L3 cache memory in high performance memory (virtual cache) using speculative fetching.

Cache management 315 takes into account that the virtual cache memory bandwidth (speed) is slower than the typical L1/L2/L3 cache bandwidth. In an embodiment, a mitigation method to speculatively read-ahead data into the higher performing memory is used. Cache management 315 also identifies when high performance memory is drained of data to be fed to L1/L2/L3 cache.

In an alternate embodiment, higher performance memory is used as higher-level cache. For example, Wide I/O DRAM would play the role of a higher-level cache than L3 cache in the SoC 101, and as such perform tasks to boost performance.

Monitor performance, health and configuration (monitor performance) 315 is responsible for monitoring the performance, such as bandwidth, health and configuration, such as memory rank, of particular types of memory. In an embodiment, monitor performance 315 queries each type of memory at power-up and/or periodically to obtain memory details, such as bandwidth and/or heat. In an embodiment, monitor performance 315 would also query different types of memory for particular memory configurations at power-up. In an embodiment, monitor performance 315 uses an ACPI driver as illustrated in FIG. 2 to monitor the performance, health and configuration of various memory types. In an embodiment monitor performance 315 compiles a health profile of a particular memory related to environmental parameters and periodically uploads such a health profile into an online catalog via the Internet.

Manage power 316 is responsible for managing the power of different types of memory. In an embodiment, manage power 316 manages power of memory types that have manageable power. In an embodiment, manage power 316 would reduce and/or increase the amount of power provided to different types of memory depending upon their status and/or configuration. In an embodiment, an embedded memory controller in processor core(s) 103 would manage the power applied to high performance memory 102. In an embodiment, manage power 316 uses an ACPI driver as illustrated in FIG. 2 to manage power of various memory types.

While DMHM 308 is described as being implemented in OS 205, in alternate embodiments DMHM 308 may be encoded in firmware of computing device 100.

Returning to other software components of OS 205, I/O device management 303 is responsible for managing I/O devices. In an embodiment, the peculiarities of specific hardware are hidden from users. In an embodiment, device drivers know the peculiarities of the specific device. For example, I/O device management 303 may be responsible for disk management functions such as free space management, memory allocation, fragmentation, removal and head scheduling.

File management 304 is responsible for creating and deleting files and directories. File management 304 may support a hierarchical file system. File management 304 may also back up files onto secondary memory.

Network management 305 is responsible for communication with networks including providing connection/routing methods. Network management 305 may also be responsible for data/process migration to other computing devices.

User interface 306 provides a character and/or graphics user interface to a user and is responsible for receiving input and providing output to a user.

Protection 307 is responsible for controlling access of programs, processes, and/or users to resources of the computing device. For example, protection 307 is responsible for controlling access to resources such as CPU cycles, memory, files, and/or I/O devices. Protection 307 is also responsible for user authentication and communication.

FIGS. 4-6B are flow charts illustrating exemplary methods of dynamically managing heterogeneous memory. In embodiments, steps illustrated in FIGS. 4-6B represent the operation of hardware (e.g., processor, memory, circuits), software (e.g., OS, applications, drivers, machine/processor executable instructions), or a user, singly or in combination. As one of ordinary skill in the art would understand, embodiments may include less or more steps shown.

Figure 4:
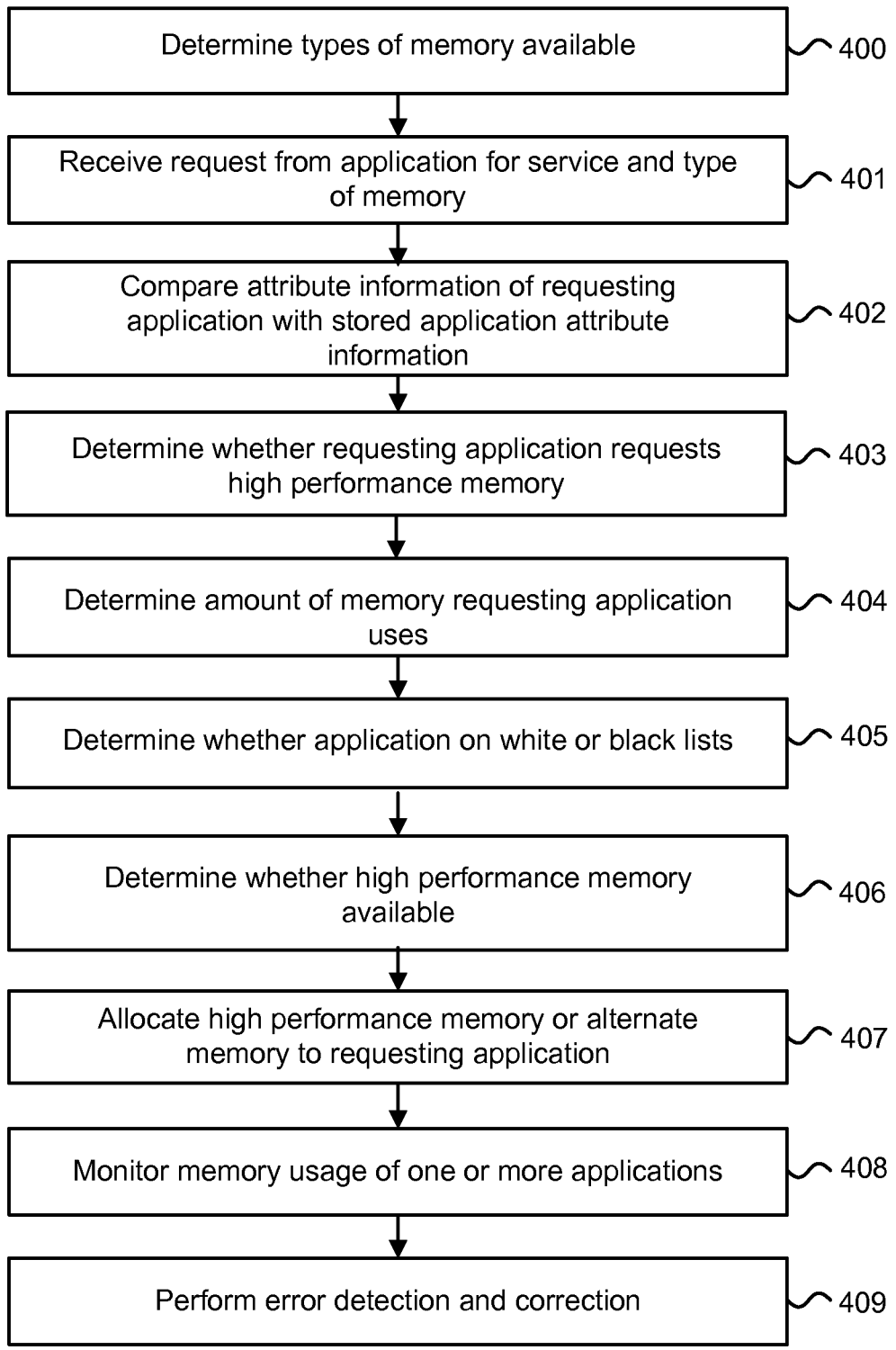
FIG. 4 is a flow chart of an exemplary method to allocate different types of memory to one or more applications.

FIG. 4 is a flow chart of an exemplary method to allocate different types of memory to one or more software applications. Step 400 illustrates determining the types of memory available in a computing device, such as computing device 100 shown in FIG. 1. In an embodiment, memory type 310 in DMHM 308 determines the types of memory available in a computing device. In an embodiment, memory type 310 determines whether there is a high performance memory available or a hierarchy of different types of performing memory available.

Step 401 illustrates receiving a request from an application for service and type of memory. In an embodiment, an application requests OS 205 for service and DMHM 308, and in particular allocate 311, determines whether the application requesting service is also requesting high performance memory. In an embodiment, allocate 311 reads an associated application manifest to determine whether the requesting application also request high performance memory. In an embodiment, a requesting application requests high performance memory 102 as illustrated in FIG. 1.

Step 402 illustrates obtaining and comparing attribute information associated with the requesting application with attribute information from the application's manifest. In an embodiment, allocate 311 reads attributes associated with applications stored in ARBT 207 (in particular an application table) and compares the attribute information with the information in the requesting application's manifest.

Step 403 then determines whether the application is requesting high performance memory in response to the comparison in step 402. When the attribute information in the application manifest of the requesting application matches the attribute information in ARBT 207, the requesting application will be allocated high performance memory when high performance memory is available and when the application is not on a black list (black list table included in ARBT 207) as illustrated in steps 404 and 405 as well as when the requesting application does not request more memory than is available as illustrated in step 406 and described herein.

Step 404 illustrates determining how much memory a requesting application will use. In an embodiment, monitor usage 312 monitors the usage of applications in memories of a computing device.

Step 405 determines whether the requesting application is on a white or black list. When the requesting application is on a white list, the application is allocated the high performance memory even though the application's attribute information does not indicate such as long as high performance memory is available and the application does not need more high performance memory than is available. When the application is on a black list, the application is denied allocation of the high performance memory regardless of whether the high performance memory is available in an embodiment. In an embodiment, black and white lists are stored in tables of ARBT 207. In alternate embodiments, black and white lists are not used.

Step 406 illustrates determining whether high performance memory is available. In an embodiment, monitor usage 312 updates allocate 311 as to the availability of high performance memory.

Step 407 illustrates allocating the requesting application high performance memory when the requesting application has 1) the appropriate attribute information, 2) is not on a black list (or is on a white list that overrides the lack of appropriate attribute information in an embodiment), 3) high performance memory is available and 4) the amount of high performance memory available is greater than the amount of memory that will be used by the requesting application. In an embodiment, allocate 311 allocates the high performance memory to the requesting application when the above condition are met. In an embodiment, less than the above conditions may be meet to allocate the high performance memory to the requesting application. Otherwise, allocate 311 allocates memory that is not high performance (alternate memory) to the requesting application. In an embodiment, memory 104 is allocated when high performance memory is not allocated.

In an embodiment, the task of allocating a request from an application for an amount of memory consists of locating a block of unused memory of sufficient size. Memory requests are satisfied by allocating portions from a large pool of memory known as the "heap." At any given time, some parts of the heap are in use, while some are "free" (unused) and thus available for future allocations.

Step 408 illustrates DMHM 308 monitoring the usage of different types of memory in a computing device. In particular, monitor usage 312 monitors the usage of high performance memory that is being used by one or more applications and the usage of other types of memory that are not high performance. Monitor usage 312 notifies allocate 311 when memory space becomes available in high performance memory as well as other types of memory in an embodiment.

Step 409 illustrates performing error detection and correction while one or more applications are using various types of memory. In an embodiment, error detection and correction 313 in DMHM 308 performs this function.

Figure 5A:
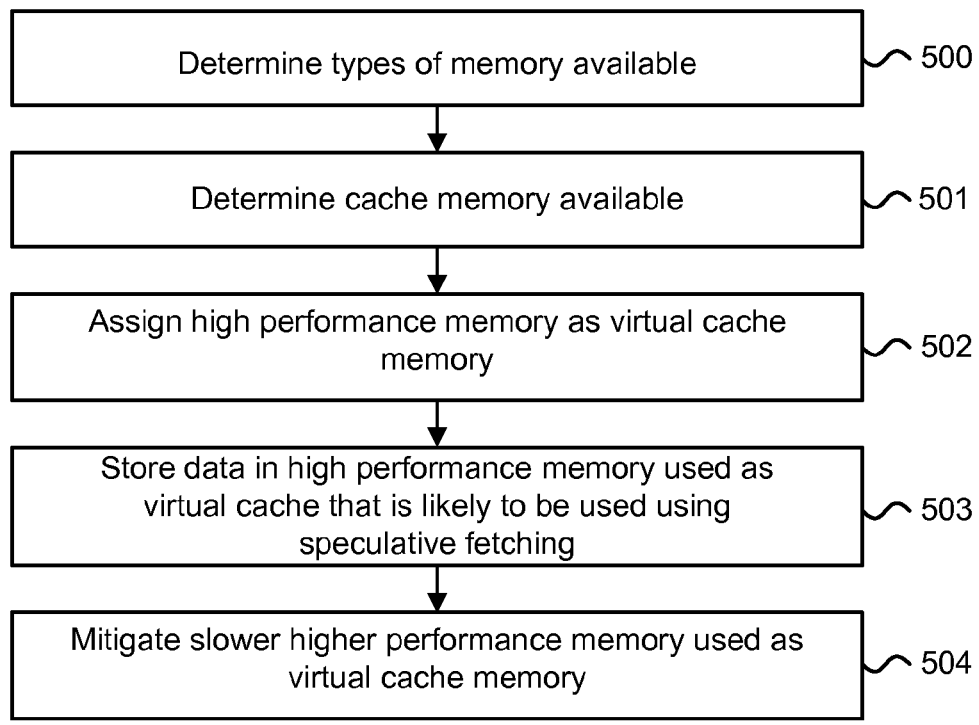
FIG. 5A is a flow chart of an exemplary method to use high performance memory as virtual cache.

FIG. 5A is a flow chart of an exemplary method to use high performance memory as virtual cache memory. Step 500 illustrates determining the types of memory available in a computing device. In an embodiment, step 500 is performed similar to step 400 as described herein. In an embodiment, memory types 310 and/or cache management 314 makes the determination.

Step 501 illustrates determining whether cache memory is available. In an embodiment, cache management 314 determines whether cache memory is available and the amount of cache memory that is available. Step 501 then determines whether high performance memory as virtual cache memory will increase the performance of the computing device. In an embodiment, cache management 314 compares the amount of cache memory available to a predetermined threshold value. When the amount of cache memory available is less than the predetermined threshold value, cache management 314 then assigns the high performance memory as virtual cache memory as illustrated in step 502. In an alternate embodiment, cache management 314 assigns high performance memory as virtual cache memory when a particular application that may benefit from such assignment requests service from OS 302.

Step 503 illustrates storing data in high performance memory that is used as virtual cache memory that is likely to be used. In an embodiment, speculative fetching is used.

Step 504 illustrates mitigating the relatively slow speed of the high performance memory used as virtual cache memory compared to actual cache memory. In an embodiment, a mitigation method to speculatively read-ahead data into the higher performing memory is used.

Figure 5B:
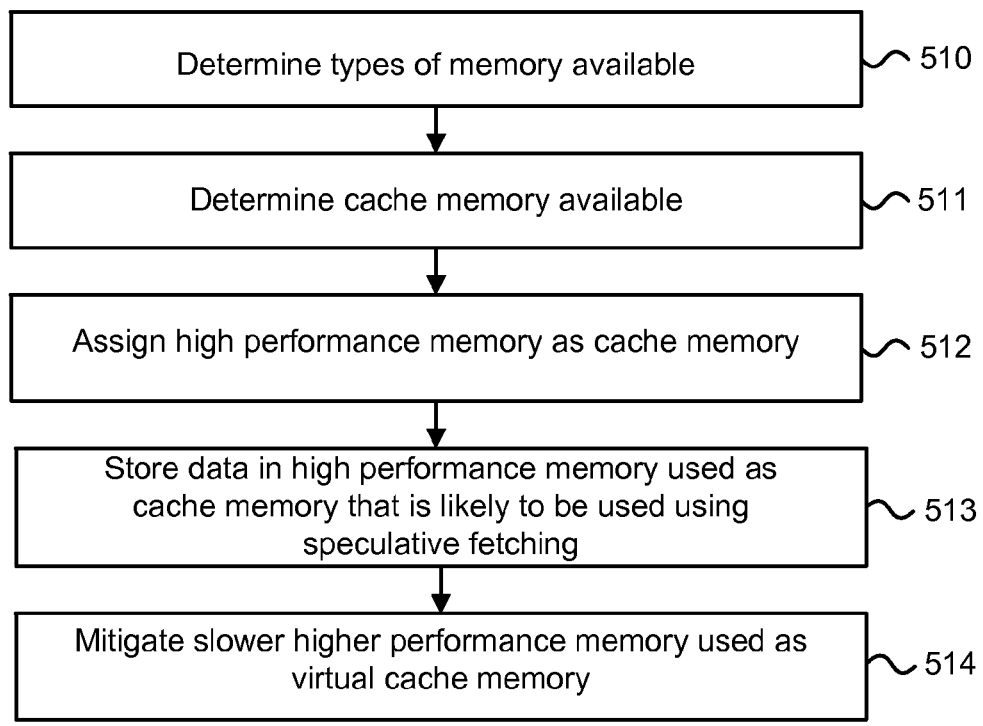
FIG. 5B is a flow chart of an exemplary method to use high performance memory as cache.

FIG. 5B is a flow chart of an exemplary method to use high performance memory as cache memory. Step 510 illustrates determining whether cache memory is available similar to step 500. In an embodiment, cache management 314 determines whether cache memory is available and the amount of cache memory that is available. Step 511 then determines whether high performance memory as cache memory will increase the performance of the computing device. In an embodiment, cache management 314 compares the amount of cache memory available to a predetermined threshold value. When the amount of cache memory available is less than the predetermined threshold value, cache management 314 then assigns the high performance memory as cache memory as illustrated in step 512. In an alternate embodiment, cache management 314 assigns high performance memory as cache memory when a particular application that may benefit from such assignment requests service from OS 302.

Steps 513 and 514 are performed similar to steps 503 and 504 except that high performance memory is used a cache memory instead of virtual cache memory.

Figure 6A:
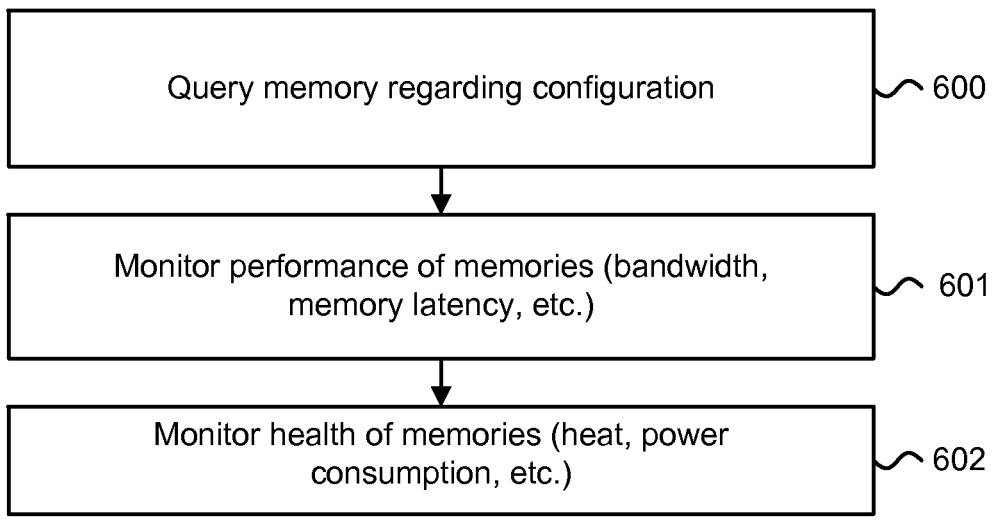
FIG. 6A is a flow chart of an exemplary method to query different types of memory to obtain memory information including configuration, performance and health.

FIG. 6A is a flow chart of an exemplary method to query different types of memory to obtain memory information including configuration, performance and health. Step 600 illustrates querying each of the different types of memory in a computing device for memory configuration information. In embodiments, memory configuration may include information relating to type, size, bandwidth, width, rank, latency, clock, timing parameters and/or other memory configuration parameters. In an embodiment, a storage location having configuration information that is not resident on the various different types of memory (such as system or configuration memory) is queried instead of the actual memory themselves.

In an embodiment, one or more processors executes OS 205, and in particular DMHM 308, to obtain memory configuration information. In an embodiment, monitor performance 315 is responsible for obtaining configuration information for each type of memory. In an embodiment, processor core(s) 103 executes OS 205 to generate control signals on signal paths 106 and 105 to high performance memory 102 and memory 104. Each memory than returns the configuration information in response to the control signals. In an embodiment, the control signals may include separate commands output on signal paths 105 and 106. In an embodiment, the control signals are output at start-up and/or periodically.

Step 601 illustrates monitoring the performance of different types of memory in a computing device. In an embodiment, processor core(s) 103 executes OS 205 similar to step 600 to obtain performance information, such as actual bandwidth and/or actual memory latency. In an alternate embodiment, OS 205 and in particular monitor performance 315 in DMHM 308, measures actual bandwidth and/or memory latency by writing to and reading from different types of memory. A test pattern may be written to a memory and then read out while measuring and/or timing performance characteristics of respective types of memory.

Step 602 illustrates obtaining health or status information from different types of memory in a computing device. In embodiment, processor core(s) 103 executes OS 205 similar to steps 600 and 601 to obtain health information, such as temperature (heat) and/or power consumption of different types of memory. Respective memories may provide health information including temperature and power consumed in a status information output by the respective types of memory in response to a control signal output from processor core(s) 103 on signal paths 105 and 106. Similar to above, these control signal may be generated at start-up or periodically. Also similar to above, a test pattern may be written to and read from the different types of memory and compared to the test pattern that was sent in order to determine whether the memory is correctly storing and outputting data (error detection).

Figure 6B:
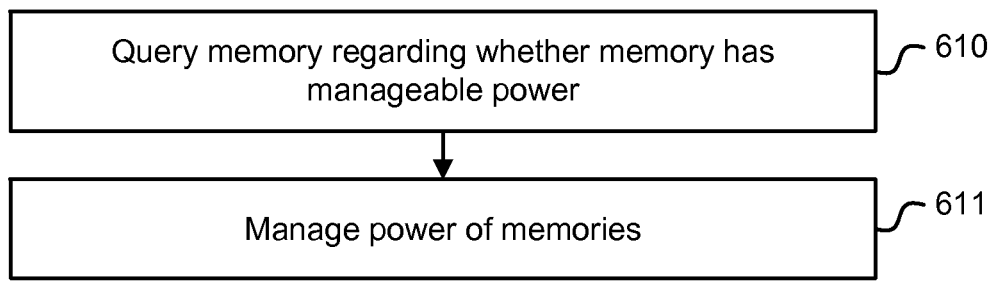
FIG. 6B is a flow chart of an exemplary method to manage different types of memory power.

FIG. 6B is a flow chart of an exemplary method to manage power for different types of memory in a computing device. Step 610 illustrates obtaining power management information from different types of memory in a computing device. In an embodiment, processor core(s) 103 executes OS 205 similar to steps above to obtain power information regarding whether a particular type of memory device may have power that may be managed. In an embodiment, power management information for respective types of memory are stored in memory that is not resident on the respective types of memory, such as system or configuration memory and may be retrieved as described above.

Step 611 illustrates managing power of different types of memory in a computing device. When a determination is made that a particular memory may have manageable power in step 610, power of the identified memory device is managed by manage power 316 in DMHM 308 in an embodiment. For example, processor core(s) 103 executing manage power 316 output a control signal that would reduce the power to a power manageable memory device when the memory device does not need the power, such as in a sleep or hibernate mode.

Figure 7:
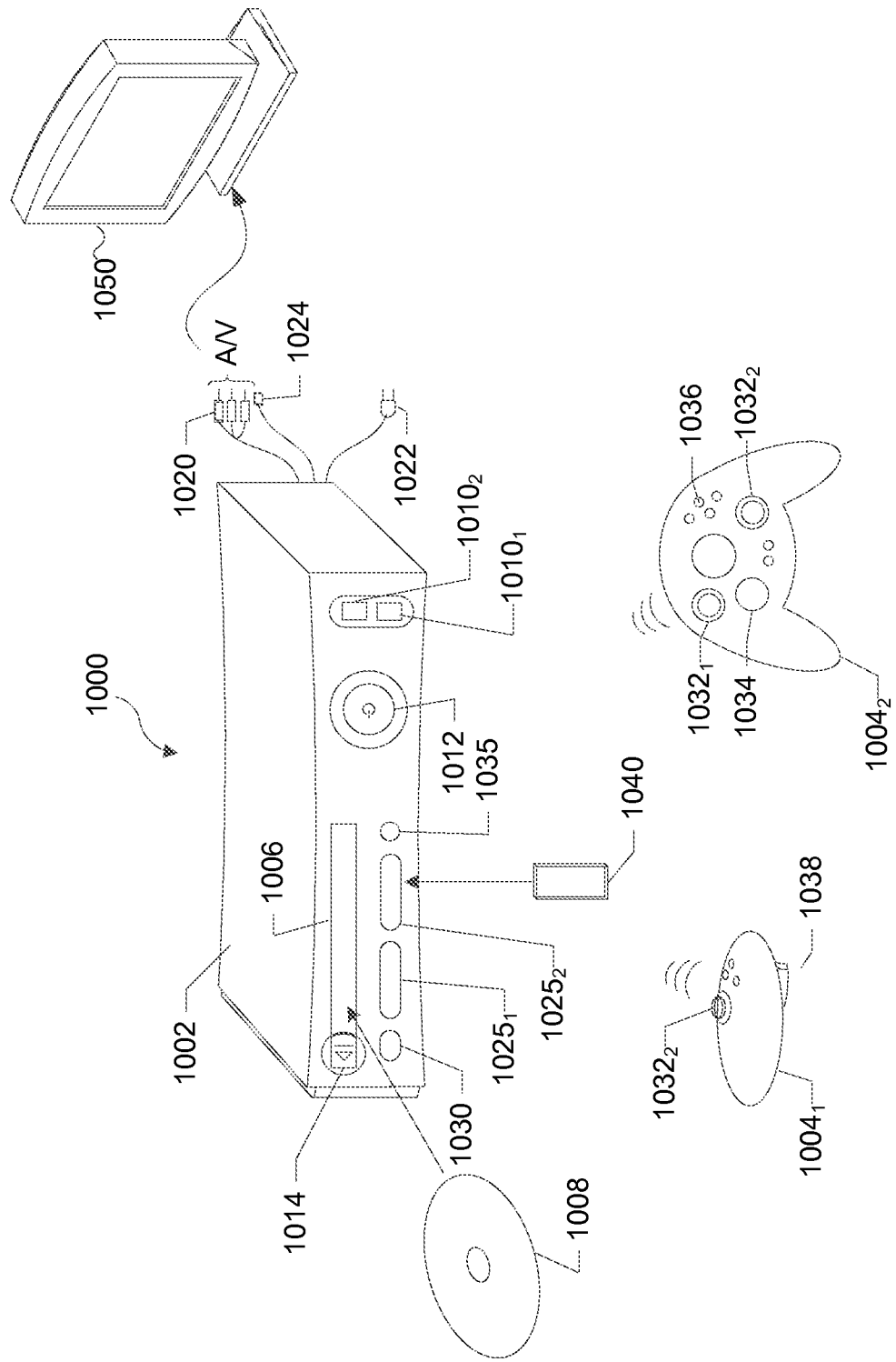
FIG. 7 is an isometric view of an exemplary gaming and media system.

In an embodiment, one or more of the computing devices 100 may be, but is not limited to, a video game and/or media console. FIG. 7 will now be used to describe an exemplary video game and media console, or more generally, will be used to describe an exemplary gaming and media system 1000 that includes a game and media console. The following discussion of FIG. 7 is intended to provide a brief, general description of a suitable computing device with which concepts presented herein may be implemented. It is understood that the system of FIG. 7 is by way of example only. In further examples, embodiments describe herein may be implemented using a variety of client computing devices, either via a browser application or a software application resident on and executed by the client computing device. As shown in FIG. 7, a gaming and media system 1000 includes a game and media console (hereinafter "console") 1002. In general, the console 1002 is one type of client computing device. The console 1002 is configured to accommodate one or more wireless controllers, as represented by controllers $1004_1$ and $1004_2$. The console 1002 is equipped with an internal hard disk drive and a portable media drive 1006 that support various forms of portable storage media, as represented by an optical storage disc 1008. Examples of suitable portable storage media include DVD, CD-ROM, game discs, and so forth. The console 1002 also includes two memory unit card receptacles $1025_1$ and $1025_2$, for receiving removable flash-type memory units 1040. A command button 1035 on the console 1002 enables and disables wireless peripheral support.

As depicted in FIG. 7, the console 1002 also includes an optical port 1030 for communicating wirelessly with one or more devices and two USB ports $1010_1$ and $1010_2$ to support a wired connection for additional controllers, or other peripherals. In some implementations, the number and arrangement of additional ports may be modified. A power button 1012 and an eject button 1014 are also positioned on the front face of the console 1002. The power button 1012 is selected to apply power to the game console, and can also provide access to other features and controls, and the eject button 1014 alternately opens and closes the tray of a portable media drive 1006 to enable insertion and extraction of an optical storage disc 1008.

The console 1002 connects to a television or other display (such as display 1050) via A/V interfacing cables 1020. In one implementation, the console 1002 is equipped with a dedicated A/V port configured for content-secured digital communication using A/V cables 1020 (e.g., A/V cables suitable for coupling to a High Definition Multimedia Interface "HDMI" port on a high definition display 1050 or other display device). A power cable 1022 provides power to the game console. The console 1002 may be further configured with broadband capabilities, as represented by a cable or modem connector 1024 to facilitate access to a network, such as the Internet. The broadband capabilities can also be provided wirelessly, through a broadband network such as a wireless fidelity (Wi-Fi) network.

Each controller 1004 is coupled to the console 1002 via a wired or wireless interface. In the illustrated implementation, the controllers 1004 are USB-compatible and are coupled to the console 1002 via a wireless or USB port 1010. The console 1002 may be equipped with any of a wide variety of user interaction mechanisms. In an example illustrated in FIG. 7, each controller 1004 is equipped with two thumb sticks $1032_1$ and $1032_2$, a D-pad 1034, buttons 1036, and two triggers 1038. These controllers are merely representative, and other known gaming controllers may be substituted for, or added to, those shown in FIG. 7. In an embodiment, a user may enter input to console 1002 by way of gesture, touch or voice. In an embodiment, optical I/O interface 1135 receives and translates gestures of a user. In another embodiment, console 1002 includes a natural user interface (NUI) to receive and translate voice and gesture inputs from a user. In an alternate embodiment, front panel subassembly 1142 includes a touch surface and a microphone for receiving and translating a touch or voice, such as a voice command, of a user.

In one implementation, a memory unit (MU) 1040 may also be inserted into the controller 1004 to provide additional and portable storage. Portable MUs enable users to store game parameters for use when playing on other consoles. In this implementation, each controller is configured to accommodate two MUs 1040, although more or less than two MUs may also be employed.

The gaming and media system 1000 is generally configured for playing games stored on a memory medium, as well as for downloading and playing games, and reproducing prerecorded music and videos, from both electronic and hard media sources. With the different storage offerings, titles can be played from the hard disk drive, from an optical storage disc media (e.g., 1008), from an online source, or from MU 1040. Samples of the types of media that gaming and media system 1000 is capable of playing include:

Game titles played from CD, DVD or higher capacity discs, from the hard disk drive, or from an online source.

Digital music played from a CD in portable media drive 1006, from a file on the hard disk drive or solid state disk, (e.g., music in a media format), or from online streaming sources.

Digital audio/video played from a DVD disc in portable media drive 1006, from a file on the hard disk drive (e.g., Active Streaming Format), or from online streaming sources.

During operation, the console 1002 is configured to receive input from controllers 1004 and display information on the display 1050. For example, the console 1002 can display a user interface on the display 1050 to allow a user to select a game using the controller 1004 and display state solvability information as discussed below.

Figure 8:
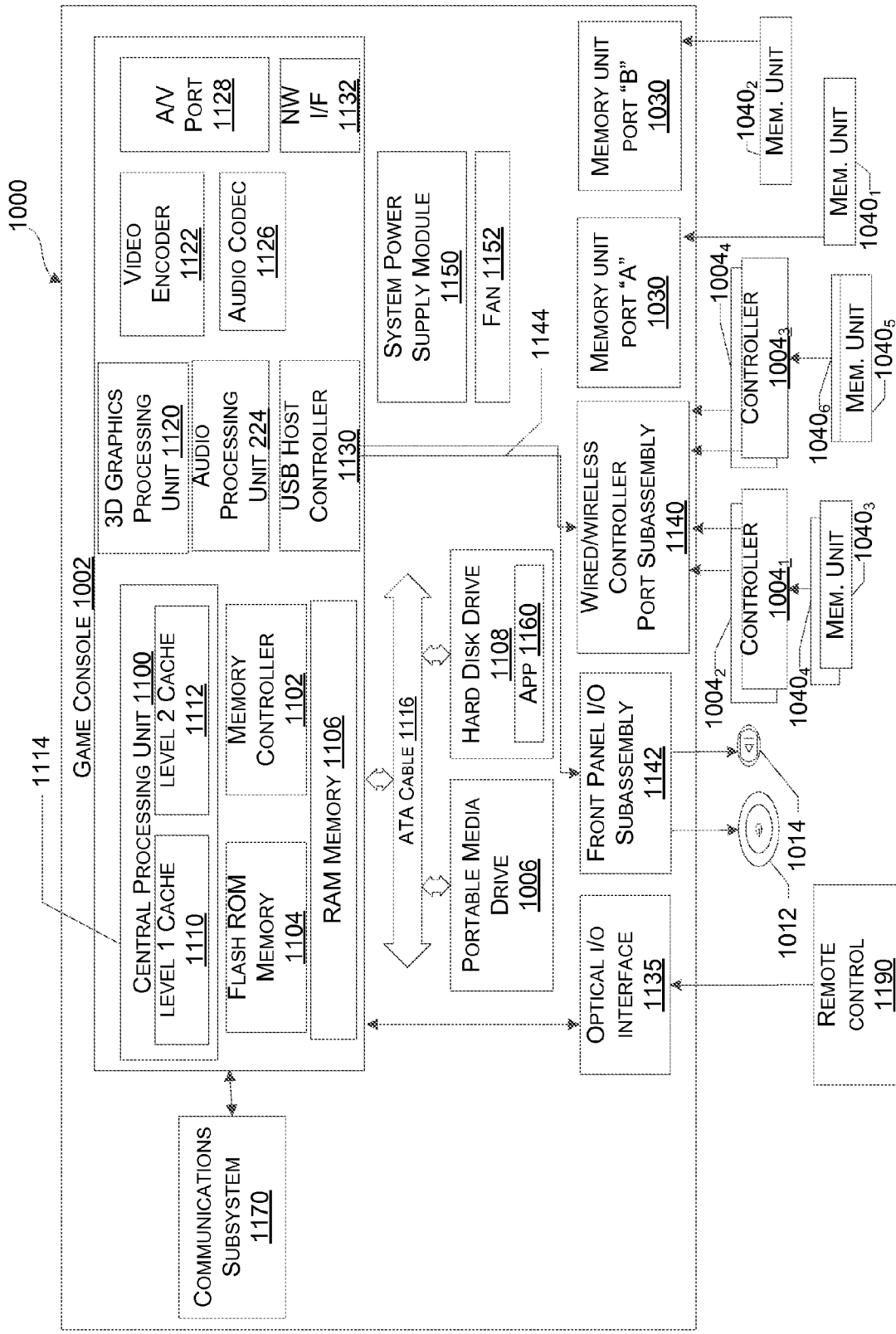
FIG. 8 is an exemplary functional block diagram of components of the gaming and media system shown in FIG. 7.

FIG. 8 is a functional block diagram of the gaming and media system 1000 and shows functional components of the gaming and media system 1000 in more detail. The console 1002 has a CPU 1100, and a memory controller 1102 that facilitates processor access to various types of memory, including a flash ROM 1104, a RAM 1106, a hard disk drive or solid state drive 1108, and the portable media drive 1006. In one implementation, the CPU 1100 includes a level 1 cache 1110 and a level 2 cache 1112, to temporarily store data and hence reduce the number of memory access cycles made to the hard drive 1108, thereby improving processing speed and throughput.

The CPU 1100, the memory controller 1102, and various memory devices are interconnected via one or more buses. The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1100, the memory controller 1102, the ROM 1104, and the RAM 1106 are integrated onto a common module 1114. In this implementation, the ROM 1104 is configured as a flash ROM that is connected to the memory controller 1102 via a PCI bus and a ROM bus (neither of which are shown). The RAM 1106 is configured as multiple Double Data Rate Synchronous Dynamic RAM (DDR SDRAM) or faster data rate DRAM modules that are independently controlled by the memory controller 1102 via separate buses. The hard disk drive 1108 and the portable media drive 1006 are shown connected to the memory controller 1102 via the PCI bus and an AT Attachment (ATA) bus 1116. However, in other implementations, dedicated data bus structures of different types can also be applied in the alternative.

In another embodiment, at least CPU 1100, level 1 cache 1110, level 2 cache 1112, memory controller 1102 and RAM memory 1106 are included in a SoC, such as SoC 101 as described herein and shown in FIG. 1. In an embodiment, RAM memory 1106 is replaced with high performance memory, such as Wide I/O DRAM and the function of memory controller 1102 is performed by processor core(s) 103. Another type of memory that in not high performance memory, such as LPDDR3 DRAM, would then be coupled to SoC 101 as described herein. Similarly, OS 205 is used by SoC 101 in the console 1002 as described herein.

A three-dimensional graphics processing unit 1120 and a video encoder 1122 form a video processing pipeline for high speed and high resolution (e.g., High Definition) graphics processing. Data are carried from the graphics processing unit 1120 to the video encoder 1122 via a digital video bus. An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link. The video and audio processing pipelines output data to an A/V (audio/video) port 1128 for transmission to a television or other display. In the illustrated implementation, the video and audio processing components 1120-1128 are mounted on the module 1114.

FIG. 8 shows the module 1114 including a USB host controller 1130 and a network interface 1132. The USB host controller 1130 is shown in communication with the CPU 1100 and the memory controller 1102 via a bus (e.g., PCI bus) and serves as host for the peripheral controllers $1004_1$-$1004_4$. The network interface 1132 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 8, the console 1002 includes a controller support subassembly 1140 for supporting the four controllers $1004_1$-$1004_4$. The controller support subassembly 1140 includes any hardware and software components to support wired and wireless operation with an external control device, such as for example, a media and game controller. A front panel I/O subassembly 1142 supports the multiple functionalities of power button 1012, the eject button 1014, as well as any LEDs (light emitting diodes) or other indicators exposed on the outer surface of console 1002. Subassemblies 1140 and 1142 are in communication with the module 1114 via one or more cable assemblies 1144. In other implementations, the console 1002 can include additional controller subassemblies. The illustrated implementation also shows an optical I/O interface 1135 that is configured to send and receive signals that can be communicated to the module 1114.

The MUs $1040_1$ and $1040_2$ are illustrated as being connectable to MU ports "A" $1030_1$ and "B" $1030_2$ respectively. Additional MUs (e.g., MUs $1040_3$-$1040_6$) are illustrated as being connectable to the controllers $1004_1$ and $1004_3$, i.e., two MUs for each controller. The controllers $1004_2$ and $1004_4$ can also be configured to receive MUs. Each MU 1040 offers additional storage on which games, game parameters, and other data may be stored. In some implementations, the other data can include any of a digital game component, an executable gaming application, an instruction set for expanding a gaming application, and a media file. When inserted into the console 1002 or a controller, the MU 1040 can be accessed by the memory controller 1102.

A system power supply module 1150 provides power to the components of the gaming system 1000. A fan 1152 cools the circuitry within the console 1002.

An application 1160 comprising processor readable instructions is stored on the hard disk drive 1108. When the console 1002 is powered on, various portions of the application 1160 are loaded into RAM 1106, and/or caches 1110 and 1112, for execution on the CPU 1100, wherein the application 1160 is one such example. Various applications can be stored on the hard disk drive 1108 for execution on CPU 1100. In an embodiment, application 1160 includes an attribute information requesting use of a particular type of memory, such as high performance memory, as described herein.

The console 1002 is also shown as including a communication subsystem 1170 configured to communicatively couple the console 1002 with one or more other computing devices (e.g., other consoles). The communication subsystem 1170 may include wired and/or wireless communication devices compatible with one or more different communication protocols. As non-limiting examples, the communication subsystem 1170 may be configured for communication via a wireless telephone network, or a wired or wireless local- or wide-area network. In some embodiments, the communication subsystem 1170 may allow the console 1002 to send and/or receive messages to and/or from other devices via a network such as the Internet. In specific embodiments, the communication subsystem 1170 can be used to communicate with a coordinator and/or other computing devices, for sending download requests, and for effecting downloading and uploading of digital content. More generally, the communication subsystem 1170 can enable the console 1002 to participate on peer-to-peer communications.

The gaming and media system 1000 may be operated as a standalone system by simply connecting the system to display 1050 (FIG. 7), a television, a video projector, or other display device. In this standalone mode, the gaming and media system 1000 enables one or more players to play games, or enjoy digital media, e.g., by watching movies, or listening to music. However, with the integration of broadband connectivity made available through network interface 1132, or more generally the communication subsystem 1170, the gaming and media system 1000 may further be operated as a participant in a larger network gaming community, such as a peer-to-peer network.

The above described console 1002 is just one example of the computing devices 100 discussed above with reference to FIG. 1 and various other Figures. As was explained above, there are various other types of computing devices with which embodiments described herein can be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method performed by a computing system to allocate a type of integrated circuit memory within the computing system to an application processed by a processor within the computing system, the method comprising:
- determining types of integrated circuit memory available for the application in the computing system, wherein the types of integrated circuit memory available include a first type of integrated circuit memory and a second type of integrated circuit memory;
- receiving a request from the application to use the first type of integrated circuit memory; and
- allocating the first type of integrated circuit memory to be used by the application in response to the request from the application.

2. The method of claim 1, wherein the first type of integrated circuit memory has at least one or more performance characteristics that is better than the second type of integrated circuit memory.

3. The method of claim 1, wherein the first type of integrated circuit memory has at least one of a higher bandwidth, lower memory latency or lower power consumption than the second type of integrated circuit memory.

4. The method of claim 1, wherein the determining includes accessing performance characteristics of the first and second types of integrated circuit memory from a list of memory performance characteristics.

5. The method of claim 4, wherein the list of performance characteristics is obtained via the Internet, and wherein the list of performance characteristics is stored in a processor readable format.

6. The method of claim 1, wherein the receiving includes reading attribute information on an application manifest that indicates the request from the application includes a request to use the first type of integrated circuit memory.

7. The method of claim 1, wherein the allocating includes transferring the request to at least one of a virtual memory allocator or physical memory allocator of a memory controller that manages the allocation of memory pages to physical memory areas in the computing device.

8. The method of claim 1, further comprising monitoring a memory location and usage of the application at the first type of integrated circuit memory.

9. The method of claim 1, further comprising comparing the application with a stored list of applications in the computing device, and allocating the first type of integrated circuit memory is replaced with allocating the second type of integrated circuit memory to be used by the application in response to the application being on the stored list, and
- wherein the allocating the first type of integrated circuit memory is replaced with allocating the second type of integrated circuit memory to be used by the application when the application usage will exceed physical memory space of the first type of integrated circuit memory.

10. The method of claim 1, further comprising allocating the first type of integrated circuit memory as cache memory accessible by the application.

11. The method of claim 1, wherein the determining includes initiating a request to the first and second types of integrated circuit memory for information regarding the integrated circuit memory, wherein the information regarding the integrated circuit memory is selected from one of memory configuration or power management.

12. An apparatus comprising:
- one or more processors;
- a first processor readable memory having a first performance characteristic;
- a second processor readable memory having a second performance characteristic, wherein the first performance characteristic is better than the second performance characteristic;
- one or more software applications; and
- an operating system including processor readable instructions, wherein the one or more processors execute the processor readable instructions of the operating system to:
- determine whether one or more software applications request usage of the first processor readable memory,
- determine an amount of processor readable memory the one or more software applications uses, and
- allow at least one of the one or more software applications access to the first processor readable memory in response to the request for usage of the first processor readable memory and the amount of processor readable memory the one or more software applications uses.

13. The apparatus of claim 12, wherein the first and second performance characteristics are selected from one of bandwidth, memory latency or power consumption.

14. The apparatus of claim 12, wherein the one or more processors and first processor readable memory are integrated into a single semiconductor die housed by a first package, and wherein the second processor readable memory is included in a second semiconductor die housed by a second package.

15. The apparatus of claim 12, wherein the one or more processors are included on a first semiconductor die and the first processor readable memory is included on a second semiconductor die, wherein the first and second dies are housed by a first package, and wherein the second processor readable memory is included in a third semiconductor die housed by a second package.

16. One or more processor readable memory devices having instructions encoded thereon which when executed cause one or more processors to perform a method for allocating high performance memory to an application software program, the method comprising:
- receiving a request from application software program to use the high performance memory;
- receiving an amount of memory the application software program uses;
- determining an amount of high performance memory that is available; and
- allocating the high performance memory to the application software program in response to the amount of memory the application software program uses and the amount of high performance memory that is available.

17. The one or more processor readable memory devices of claim 16, further comprising allocating memory that is not the high performance memory to the application software program when the amount of memory the application software program uses exceeds the amount of the high performance memory available.

18. The one or more processor readable memory devices of claim 17, wherein the high performance memory has one of a greater bandwidth, lower memory latency or lower power consumption than the memory that is not the high performance memory.

19. The one or more processor readable memory devices of claim 18, wherein receiving a request includes reading attribute information on a manifest of the application software program.

20. The one or more processor readable memory devices of claim 19, further comprising monitoring the high performance memory and the memory that is not the high performance for at least one of health, performance or configuration.

* * * * *